(12) United States Patent
McDonald

(10) Patent No.: US 8,828,511 B2
(45) Date of Patent: Sep. 9, 2014

(54) OBJECT MADE OF HOLLOW GLASS

(75) Inventor: Neill McDonald, Versailles (FR)

(73) Assignee: Saint-Gobain Emballage, Courbevoie (FR)

( * ) Notice: Subject to any disclaimer, the term of this patent is extended or adjusted under 35 U.S.C. 154(b) by 949 days.

(21) Appl. No.: 12/996,269

(22) PCT Filed: Jun. 12, 2009

(86) PCT No.: PCT/FR2009/051108
§ 371 (c)(1),
(2), (4) Date: Dec. 3, 2010

(87) PCT Pub. No.: WO2009/150382
PCT Pub. Date: Dec. 17, 2009

(65) Prior Publication Data
US 2011/0081458 A1 Apr. 7, 2011

(30) Foreign Application Priority Data
Jun. 12, 2008 (FR) ...................... 08 53901

(51) Int. Cl.
*A47G 19/22* (2006.01)
*C03C 4/00* (2006.01)
*C03C 4/02* (2006.01)
*C03C 4/08* (2006.01)
*C03C 3/095* (2006.01)
C03C 3/087 (2006.01)

(52) U.S. Cl.
CPC ... *C03C 4/02* (2013.01); *C03C 4/00* (2013.01); *Y10S 501/904* (2013.01); *Y10S 501/905* (2013.01); *C03C 3/087* (2013.01); *C03C 4/085* (2013.01); *C03C 4/08* (2013.01); *C03C 3/095* (2013.01)
USPC ............ 428/34.4; 428/426; 501/70; 501/904; 501/905

(58) Field of Classification Search
CPC .......... C03C 3/087; C03C 3/095; C03C 4/02; C03C 4/085; C03C 4/00; C03C 4/08; C03C 4/092; Y10S 501/905; Y10S 501/904
USPC ..................... 426/106; 428/34.4, 426; 501/70
See application file for complete search history.

(56) References Cited

U.S. PATENT DOCUMENTS

| | | | |
|---|---|---|---|
| 6,218,323 B1* | 4/2001 | Bretschneider et al. | 501/71 |
| 2011/0081458 A1* | 4/2011 | McDonald | 426/106 |
| 2011/0135938 A1* | 6/2011 | Kim et al. | 428/426 |
| 2012/0121915 A2* | 5/2012 | Cintora et al. | 428/426 |

FOREIGN PATENT DOCUMENTS

| | | |
|---|---|---|
| SU | 1 671 625 | 8/1991 |
| WO | 2006 120663 | 11/2006 |

OTHER PUBLICATIONS

International Search Report issued Dec. 17, 2009 in PCT/FR09/051108 filed Jun. 12, 2009.

* cited by examiner

*Primary Examiner* — N. Edwards

(74) *Attorney, Agent, or Firm* — Oblon, Spivak, McClelland, Maier & Neustadt, L.L.P.

(57) ABSTRACT

The invention relates to a hollow glass article having, for a thickness of 5 mm, an overall light transmission greater than or equal to 70%, said overall light transmission being calculated by taking into consideration the illuminant C as defined by the ISO/CIE 10526 standard and the CIE 1931 standard colorimetric observer as defined by the ISO/CIE 10527 standard, and a filtering power greater than or equal to 65%, especially 70%, said filtering power being defined as being equal to the value of 100% reduced by the arithmetic mean of the transmission between 330 and 450 nm, said article having a chemical composition of soda-lime-silica type, which comprises the following optical absorbent agents in a content that varies within the weight limits defined below:
$Fe_2O_3$ (total iron) 0.01 to 0.15%
$TiO_2$ 0.5 to 3%
Sulfides ($S^{2-}$) 0.0010 to 0.0050%.

20 Claims, No Drawings

OBJECT MADE OF HOLLOW GLASS

The present invention relates to hollow glass articles, such as bottles, flasks or pots, that have a high light transmission and a strong protection against degradations due to radiation.

It is known that ultraviolet radiation (UV), in particular solar radiation, may interact with many liquids and sometimes degrade their quality. This is for example the case with certain consumable liquids, including certain wines such as champagne, or beer, the color and the taste of which may be impaired. There is therefore a real need, both in the agri-food industry and the cosmetics industry, for glass containers capable of absorbing most of the ultraviolet radiation.

Hollow articles made of glass meeting this constraint are extremely commonplace, but in general they are strongly colored, and therefore have a low light transmission. Wine or beer are, for example, often packaged in brown or green bottles, these colorations being obtained by the addition of pigments such as chromium oxide or sulfides of transition elements, such as iron sulfides. However, these tinted containers have the drawback of masking the coloration of the liquid that they contain.

In certain cases, it may be desirable, mainly for esthetic reasons, to be able to fully appreciate the coloration of the contents, and therefore to have hollow glass articles that exhibit both a high light transmission and a neutral tint.

Application WO 2005/075368 describes glass compositions capable of solving this problem. These compositions, which comprise vanadium oxide and manganese oxide, make it possible to obtain hollow glass articles that exhibit both a low ultraviolet transmission (for wavelengths below 380 nm) and a high light transmission (in the range of wavelengths between 380 and 780 nm).

It has however emerged that the protection conferred by these articles could, in certain respects, prove insufficient in the long term, in particular for liquids such as still or sparkling white wines, in particular champagne. The objective of the invention is to increase the shelf life of these liquids, contained in glass packaging, while making it possible to view the appearance of said liquids.

For this purpose, one subject of the invention is a hollow glass article having, for a thickness of 5 mm, an overall light transmission greater than or equal to 70%, said overall light transmission being calculated by taking into consideration the illuminant C as defined by the ISO/CIE 10526 standard and the CIE 1931 standard colorimetric observer as defined by the ISO/CIE 10527 standard, and a filtering power greater than or equal to 65%, especially 70%, said filtering power being defined as being equal to the value of 100% reduced by the arithmetic mean of the transmission between 330 and 450 nm. The article of the invention is such that its chemical composition is of soda-lime-silica type and comprises the following optical absorbent agents in a content that varies within the weight limits defined below:

$Fe_2O_3$ (total iron) 0.01 to 0.15%
$TiO_2$ 0.5 to 3%
Sulfides ($S^{2-}$) 0.0010 to 0.0050%.

The glass article according to the invention preferably has one or more of the following properties, always calculated for a thickness of 5 mm:
  a transmission for a wavelength of 440 nm that is less than or equal to 70%, preferably 65%, especially 60% and even 55% or 50%, or even 45%, or 40% and even 35%;
  an ultraviolet transmission, calculated according to the ISO 9050 standard, of less than or equal to 20%, preferably 15%, especially 10% and even 5%; and
  a light transmission greater than or equal to 75%, especially 80%, and even 85%.

The radiation whose wavelength is close to 440 nm has proved to be, with ultraviolet radiation, the most harmful for liquids such as white wines, especially champagne.

Preferably, these optical properties are those of the glass article alone, therefore excluding any organic or inorganic coating. The optical properties depend, in a known manner, on the thickness of the glass. It goes without saying that the glass article according to the invention does not necessarily have a thickness of 5 mm. It is important, on the other hand, that the main optical properties are respected for an equivalent thickness of 5 mm. In the case where the thickness of the article is not equal to 5 mm, it is easy to calculate these properties for an equivalent thickness of 5 mm from a measurement carried out on the article, taking into account its actual thickness.

Surprisingly, this combination of optical properties has proved able to solve the technical problem that is the basis of the invention, namely the increase in the shelf life of certain liquids, in particular champagne, while making it possible to view the appearance of said liquids.

These two properties (high light transmission on the one hand and high filtering power on the other hand) were until now judged to be incompatible, since a high light transmission assumes a high transmission in the visible range, therefore between 380 and 780 nm. Thus, the existing packaging, the filtering power of which is high, has a very deep tint (green or brown) and consequently a low light transmission.

Unless otherwise indicated, all the compositions are expressed in percentages by weight, and the content of an oxide of a given metal corresponds to the total content of this metal oxide, without prejudging the actual degree of oxidation of the metal ion in question. When preferred minimum or maximum contents are given, it is understood that any range resulting from a combination between a minimum content and a maximum content is expressly part of the present description.

The composition preferably comprises one or more of the following limitations, alone or in combination:
  preferably, the iron oxide content is greater than or equal to 0.02%, especially 0.03% and even 0.04%, or else 0.05% or 0.06% and/or less than or equal to 0.14%, especially 0.13% and even 0.12%, or even 0.11% or 0.10%;
  the titanium oxide content is preferably greater than or equal to 0.6%, especially 0.7% and even 0.8% or 0.9%, or else 1% and/or less than or equal to 2.5%, especially 2.4%, or even 2.3% and even 2.2% or else 2.1%; and
  the content of sulfides is preferably greater than or equal to 0.0015%, especially 0.0020% and/or less than or equal to 0.0040%, or even 0.0035%.

The redox, defined by the ratio of the molar content of ferrous oxide (expressed as FeO) to the molar content of total iron (expressed as $Fe_2O_3$), which is an indicator of the redox state of the glass, is preferably greater than or equal to 0.5, especially 0.55 and even 0.6. The redox is generally controlled using oxidizing agents such as sodium sulfate, and a reducing agents such as coke, the relative contents of which are adjusted in order to obtain the desired redox.

The composition according to the invention preferably does not comprise any absorbent agent for a wavelength between 300 and 1000 nm other than the iron and titanium oxides and the sulfide ions. In particular, the composition according to the invention preferably does not contain agents chosen from the following agents: oxides of transition elements such as CoO, CuO, $Cr_2O_3$, $V_2O_5$, $MnO_2$ oxides of rare earths such as $CeO_2$, $La_2O_3$, $Er_2O_3$, or $Nd_2O_3$, or else coloring agents in the elemental state such as Se, Ag, Cu.

The use of the aforementioned optical absorbent agents within the limits of the invention makes it possible to give the glass the desired properties and also to optimize its optical and energy properties.

As a general rule, it is difficult to predict the optical and energy properties of a glass when it contains several optical absorbent agents. This is because these properties result from a complex interaction between the various agents, the behavior of which is furthermore linked to the glass matrix used and to their oxidation state. This is particularly the case for the compositions according to the invention, which contain at least two elements that exist in several valent states.

The expression "soda-lime-silica" is used here in the broad sense and relates to any glass composition composed of a glass matrix which comprises the following constituents (in percentage by weight):

$SiO_2$ 64-75%
$Al_2O_3$ 0-5%
$B_2O_3$ 0-5%, preferably 0
CaO 5-15%
MgO 0-10%
$Na_2O$ 10-18%
$K_2O$ 0-5%
BaO 0-5%, preferably 0.

It should be mentioned here that the soda-lime-silica glass composition may include, apart from the inevitable impurities contained, in particular, in the batch materials, a small proportion (up to 1%) of other constituents, for example agents for promoting the melting or refining of the glass ($SO_3$, Cl, $Sb_2O_3$, $As_2O_3$), or that come from a possible addition of recycled cullet into the batch mix.

In the glass according to the invention, the silica is generally kept within narrow limits for the following reasons. Above 75%, the viscosity of the glass and its ability to devitrify increase greatly, which makes it more difficult to melt and flow on the molten tin bath. Below 64%, the hydrolytic resistance of the glass decreases rapidly and the transmission in the visible range also decreases.

Alumina $Al_2O_3$ plays a particularly important role in the hydrolytic resistance of the glass. When the glass according to the invention is intended to form hollow bodies that contain liquids, the alumina content is preferably greater than or equal to 1%.

The alkali metal oxides $Na_2O$ and $K_2O$ facilitate the melting of the glass and make it possible to adjust its viscosity at high temperatures in order to keep it close to that of a standard glass. $K_2O$ may be used up to 5%, since beyond this the problem of the high cost of the composition arises. Furthermore, the increase in the percentage of $K_2O$ can be accomplished, for the main part, only to the detriment of $Na_2O$, which contributes to increasing the viscosity. The sum of the $Na_2O$ and $K_2O$ contents, expressed as percentages by weight, is preferably greater than or equal to 10% and advantageously less than 20%. If the sum of these contents is greater than 20% or if the content of $Na_2O$ is greater than 18%, the hydrolytic resistance is greatly reduced. The glass according to the invention is preferably free of lithium oxide $Li_2O$ due to its high cost.

Alkaline-earth metal oxides make it possible to adapt the viscosity of the glass to the production conditions.

MgO may be used up to around 10% and its omission may be at least partly compensated for by an increase in the $Na_2O$ and/or $SiO_2$ content. Preferably, the MgO content is less than 5% and particularly advantageously is less than 2%, which has the effect of increasing the infrared absorptivity without impairing the transmission in the visible range. Low MgO contents also make it possible to reduce the number of batch materials needed for melting the glass.

BaO has a much smaller influence than CaO and MgO on the viscosity of the glass and the increase of its content is mainly accomplished to the detriment of the alkali metal oxides, MgO and especially CaO. Any increase in BaO contributes to increasing the viscosity of the glass at low temperatures. Preferably, the glass according to the invention is free of BaO and also of strontium oxide (SrO), these elements having a high cost.

Apart from complying with the limits defined previously for the variation in the content of each alkaline-earth metal oxide, it is preferably, in order to obtain the desired transmission properties, to limit the sum of the weight percentages of MgO, CaO and BaO to a value less than or equal to 15%.

The glass composition according to the invention is able to be melted under the production conditions for glass intended for forming hollow bodies using pressing, blowing or else molding techniques. Melting generally takes place in flame-fired furnaces, optionally provided with electrodes for heating the glass in the batch by passing an electric current between the two electrodes. To facilitate the melting operation, and in particular to make the latter mechanically advantageous, the glass composition advantageously has a temperature corresponding to a viscosity $\eta$ such that $\log \eta = 2$ that is less than 1500° C. More preferably, the temperature corresponding to the viscosity $\eta$ such that $\log \eta = 3.5$ (denoted by $T(\log \eta = 3.5)$) and the liquidus temperature (denoted by $T_{liq}$) satisfy the equation:

$$T(\log \eta = 3.5) - T_{liq} > 20° C.$$

and better still:

$$T(\log \eta = 3.5) - T_{liq} > 50° C.$$

The addition of optically absorbent oxides may be carried out in the furnace (the process is then referred to as "tank coloration") or in the feeders that transport the glass between the furnace and the forming installations (the process is then referred to as "feeder coloration"). Feeder coloration requires a particular addition/mixing installation but does have, however, advantages as regards flexibility and reactivity that are particularly desirable when the production of an extended range of particular optical properties and/or tints is required. In the particular case of feeder coloration, the optical absorbent agents are incorporated into glass frits or agglomerates, which are added to a clear glass in order to form, after homogenization, the glass according to the invention. Different frits can be employed for each added oxide, but it may be advantageous in certain cases to have a single frit comprising all the useful optical absorbent agents. It is desirable for the contents of optical absorbent oxides in the frits or the agglomerates employed to be between 5 and 30%, so as not to exceed levels of frit dilution in the molten glass greater than 10%, especially 5%, and advantageously 2%. This is because above this it becomes difficult for the molten glass to be suitably homogenized, while still maintaining high outputs compatible with a low overall economic cost of the process.

Another subject of the invention is therefore a process for manufacturing a glass having a composition according to the invention, comprising a step of melting one portion of the batch mix, a step of transporting the molten glass to the forming device, during which oxides are added to said molten glass by means of glass frits or agglomerates, at least one portion of the optical absorbent agents being supplied to the composition during this step, and a step of forming said glass in order to obtain a hollow article.

Preferably, all the optical absorbent agents, apart from the iron, are supplied to the composition during the step of transporting the molten glass to the forming device.

Another subject of the invention is a process for manufacturing a glass having a composition according to the invention, comprising a step of melting the batch mix in a melting furnace, said batch mix supplying all of the oxides included in said composition, and a forming step.

Any process that makes it possible to obtain a hollow glass article can be used. By way of non-limiting examples, mention may be made of the "press and blow" and "blow and blow" processes that are well known to a person skilled in the art.

The article according to the invention is preferably a bottle, in particular capable of containing or that contains beer or still or sparkling white wine, in particular champagne.

The present invention will be better understood on reading the detailed description below of non-limiting exemplary embodiments illustrated by Table 1.

Indicated in these examples are the values of the following optical properties calculated, for a glass thickness of 5 mm, from experimental spectra:

the overall light transmission ($LT_c$), calculated between 380 and 780 nm. These calculations are carried out by taking into consideration the illuminant C as defined by the ISO/CIE 10526 standard and the CIE 1931 standard colorimetric observer as defined by the ISO/CIE 10527 standard;

the filter power (denoted by FP), defined as being equal to the value of 100% reduced by the arithmetic mean of the transmission between 330 and 450 nm;

the ultraviolet transmission (UVT), calculated according to the ISO 9050 standard; and the transmission for a wavelength of 440 nm ($T_{440}$).

Also indicated in Table 1 are the weight contents of optical absorbent agents.

The compositions that appear in Table 1 are produced from the following glass matrix, the contents of which are expressed in percentages by weight, this being corrected for the silica in order to adapt to the total content of coloring agents added.

$SiO_2$ 71.0%
$Al_2O_3$ 1.40%
$Fe_2O_3$ 0.05%
CaO 12.0%
MgO 0.1%
$Na_2O$ 13.0%
$K_2O$ 0.35%

TABLE 1

|  | Example | | |
| --- | --- | --- | --- |
|  | 1 | 2 | 3 |
| $Fe_2O_3$ (%) | 0.05 | 0.1 | 0.1 |
| Redox | 0.7 | 0.6 | 0.63 |
| $TiO_2$ (%) | 1.0 | 1.0 | 2.0 |
| $S^{2-}$ (%) | 0.0035 | 0.0020 | 0.0025 |
| $LT_c$ (%) | 78.2 | 73.9 | 72.1 |
| FP (%) | 66.7 | 67.2 | 73.4 |
| UVT (%) | 26.3 | 25.9 | 18.7 |
| $T_{440}$ (9%) | 38.4 | 37.6 | 33.8 |

The invention claimed is:

1. A hollow glass article, comprising:
   soda-lime-silica glass comprising an optical absorbent agent comprising:
   $Fe_2O_3$ (total iron) 0.01 to 0.15% wt;
   $TiO_2$ 0.5 to 3% wt; and
   Sulfides ($S^{2-}$) 0.0010 to 0.0050% wt,
   relative to a total weight of the glass,
   wherein the hollow glass article has, for a thickness of 5 mm:
   an overall light transmission greater than or equal to 70%, as calculated by taking into consideration illuminant C as defined by the ISO/CIE 10526 standard and the CIE 1931 standard colorimetric observer as defined by the ISO/CIE 10527 standard, and
   a filtering power greater than or equal to 65%, as defined by being equal to 100% reduced by an arithmetic mean of transmission between 330 and 450 nm.

2. The article of claim 1, having, for a thickness of 5 mm, a transmission for a wavelength of 440 nm that is less than or equal to 70%.

3. The article of claim 1, having an ultraviolet transmission, calculated according to the ISO 9050 standard, of less than or equal to 20%.

4. The article of claim 3, having an ultraviolet transmission of less than or equal to 10%.

5. The article of claim 1, having a transmission, for a wavelength of 440 nm, of less than or equal to 50%.

6. The article as claimed of claim 1, having a light transmission greater than or equal to 75%.

7. The article of claim 1, wherein a redox of the glass is greater than or equal to 0.5.

8. The article of claim 1, wherein an iron oxide content is between 0.04% and 0.12%.

9. The article of claim 1, wherein a titanium oxide content is between 0.8% and 2.2%.

10. The article of claim 1, wherein a content of sulfides is between 0.0015% and 0.0040%.

11. The article of claim 1, in the form of a bottle comprising beer or white wine or champagne.

12. The article of claim 1, wherein the filtering power is greater than or equal to 70%.

13. The article of claim 3, having an ultraviolet transmission of less than or equal to 5%.

14. The article of claim 1, having a transmission, for a wavelength of 440 nm, of less than or equal to 40%.

15. The article as claimed of claim 1, having a light transmission greater than or equal to 80%.

16. The article as claimed of claim 1, having a light transmission greater than or equal to 85%.

17. The article of claim 12, having, for a thickness of 5 mm, a transmission for a wavelength of 440 nm that is less than or equal to 70%.

18. The article of claim 2, having an ultraviolet transmission, calculated according to the ISO 9050 standard, of less than or equal to 20%.

19. The article of claim 12, having an ultraviolet transmission, calculated according to the ISO 9050 standard, of less than or equal to 20%.

20. The article of claim 2, wherein the transmission for a wavelength of 440 nm is less than or equal to 50%.

* * * * *